L. C. BURNET.
VEHICLE SPRING.
APPLICATION FILED AUG. 24, 1907.

921,947.

Patented May 18, 1909.

Attest:

Inventor: Lewis C. Burnet
by ............ Attys.

UNITED STATES PATENT OFFICE.

LEWIS C. BURNET, OF NEWARK, NEW JERSEY, ASSIGNOR TO BURNET COMPOUND SPRING, INC., OF NEWARK, NEW JERSEY, A CORPORATION OF NEW JERSEY.

VEHICLE-SPRING.

No. 921,947.     Specification of Letters Patent.     Patented May 18, 1909.

Application filed August 24, 1907. Serial No. 389,945.

*To all whom it may concern:*

Be it known that I, LEWIS C. BURNET, a citizen of the United States, and a resident of the city of Newark, in the county of Essex and State of New Jersey, have invented certain new and useful Improvements in Vehicle-Springs, of which the following is a specification, reference being had to the accompanying drawings, forming a part hereof.

The main object of this invention is to provide a spring for vehicles, particularly such vehicles as automobiles and the like, which shall combine in itself the qualities of both vehicle spring and shock absorber.

The objection to shock absorbers which are attached to vehicles independently of the springs is chiefly that they interfere in a considerable measure with the natural action of the springs and thereby destroy in part the flexibility and cushioning effect of the springs, whereby the comfortableness of the vehicle becomes more or less sacrificed to the protection of the spring system.

The aim of the present improvements is to secure the desired protection of the vehicle springs against extraordinary shocks and jars without interfering at all with the flexibility of the springs and the springiness of the vehicle body; and in accordance with the invention a compound spring is employed which is adapted to give the desired cushioning effect to the vehicle body and at the same time to absorb any heavy shocks which may be developed as the vehicle is moving.

The improved compound spring preferably comprises a relatively weaker and a relatively stronger spring element or elements, the one being arranged to transmit its total impulses to the other during the relative movement of the vehicle body with respect to the vehicle frame.

Figure 1:
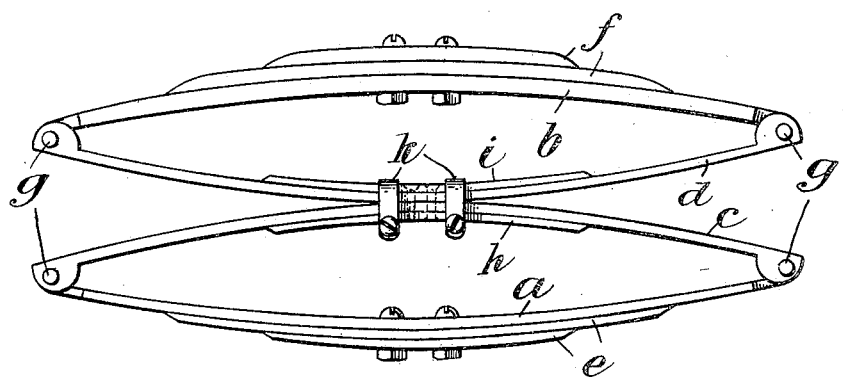
Figure 2:
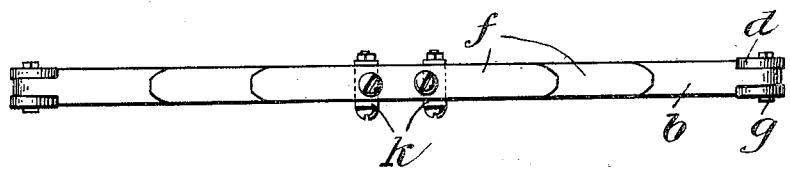
Figure 3:

The invention will be more fully described in connection with the accompanying drawings in which, Figure 1 is a view in elevation of a spring embodying the invention, Fig. 2 is a plan view, and, Fig. 3 is a detail view showing clamps $k$ for securing together the intermediate members of the spring to be referred to below.

In the embodiment of the invention shown in the drawings, there are what may be referred to as four main elements: A lower member $a$, an upper member $b$, forming the outer members, and two intermediate members $c$ and $d$. The outer members are bowed and may be provided with a plurality of leaves to render them relatively stiff, the leaves being provided preferably upon the exterior of these members as at $e$ upon the lower member and at $f$ upon the upper member. In the present case the upper member and the leaves thereupon are somewhat thicker and stronger than the corresponding elements of the lower member, this being in accordance with what at the present time is believed to be the preferable construction. It is not an essential however that the upper and lower members $b$ and $a$ shall differ in respect to strength or thickness. The intermediate members $c$ and $d$ are, however, weaker in comparison with the outer members, that is, these intermediate members as a whole are less stiff than the outer members with their complement of leaves. In the present arrangement, the outer members and the intermediate members are bowed and each intermediate member is secured at its ends to one of the outer members as by bolts $g$, so that it presents its concave face to the concave face of the outer member; and the intermediate members are secured together with their convex sides facing each other. The whole spring therefore, in the present embodiment, presents the form of a double elliptic spring.

In operation, when the vehicle is running over a relatively smooth road, the spring will permit the necessary flexibility of the vehicle body and will act much in the same way as any other spring. When however the vehicle encounters a sudden obstruction or a relatively deep recess, the intermediate members $c$ and $d$ will permit the spring to compress or expand with much greater freedom thus securing a much more even running of the vehicle body than if the intermediate members $c$ and $d$ were very stiff. After passing the interruption in the road, the spring, in recovering itself, would tend ordinarily to expand beyond the breaking point of the intermediate members $c$ and $d$ and thus would not only produce in the vehicle body annoying oscillations but would render the fracture of the intermediate members $c$ and $d$ possible and likely. In order to retain the benefit of the members $c$ and $d$ in eliminating the shocks and jars to the vehicle body without at the same time weakening the spring in the manner just pointed out, there is provided in connection with the intermediate members a means of limiting their return movement after a compression has taken place or in other words a means of reinforcing these members before they have expanded beyond a certain point which has been referred to above as their breaking point. These means in the present case are supplied by providing leaves $h$ and $i$ respectively upon the concave sides of these members that is upon the sides facing the outer members $a$ and $b$ respectively, which leaves, as is obvious, will permit the intermediate members $c$ and $d$ to be perfectly flexible during compression but which will reinforce or retard their expansion materially beyond a certain point. The precise form or number of these leaves $h$ and $i$ is of course unimportant as well as the particular manner in which they are secured to the members $c$ and $d$. It seems preferable to provide clamps such as $k$ for instance, one on each side of the center and which may be adjusted to meet the needs of any particular vehicle and then fastened securely in position.

It will be observed that the ends of the members $c$ and $d$ have their opposing faces substantially flat, and this is done so that when the spring has been compressed so as to bring the ends of the members $c$ and $d$ into contact, they will rest flatly against each other. When this occurs, it will be obvious that the outer members $a$ and $b$ are carrying the excess of the load and that no further stress can be placed upon the members $c$ and $d$.

Departures may be made from the construction shown and described without avoiding the spirit of the invention.

I claim as my invention:

1. In a vehicle spring, the combination of a relatively stiff bowed member, a relatively weak bowed member, said members being secured together with their concave sides facing in so as to be independently flexible, and means to limit the return of the weaker member after compression.

2. In a vehicle spring, the combination of a relatively stiff bowed member, a relatively weak bowed member, said members being secured together with their concave sides facing in so as to be independently flexible, and a leaf on the weaker member facing inside.

3. In a vehicle spring, the combination of two relatively stiff outer members, two relatively weak inner members, and means to limit the return of the weaker members after compression.

4. In a vehicle spring, the combination of two relatively stiff members bowed outwardly, two relatively weak members between the two stiff members, said weak members being bowed with their convex sides facing together and their concave sides facing respectively the stiff members, means to secure the two weaker members together, means to secure each of them to the respective stiff members, and a leaf on each of them facing the corresponding stiff members.

5. In a vehicle spring, the combination of an upper member, a lower member, two relatively weak intermediate members, leaves upon said intermediate members to resist the expansion of the spring, and clamps on the intermediate members to determine the flexibility of the spring.

6. In a vehicle spring, the combination of an upper member having relatively thick leaves, a lower member having relatively thin leaves, two intermediate members between the upper and lower members, leaves upon the intermediate members to resist the expansion of the spring, and clamps upon the intermediate members to determine the flexibility of the spring.

This specification signed and witnessed this 22nd day of August, 1907.

LEWIS C. BURNET.

Signed in the presence of:
LUCIUS E. VARNEY,
AMBROSE L. O'SHEA.